United States Patent
Seo et al.

(10) Patent No.: US 9,877,215 B2
(45) Date of Patent: *Jan. 23, 2018

(54) METHOD FOR MEASURING CHANNEL STATE INFORMATION IN A WIRELESS ACCESS SYSTEM AND APPARATUS FOR SAME

(71) Applicant: LG ELECTRONICS INC., Seoul (KR)

(72) Inventors: Hanbyul Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/272,095

(22) Filed: Sep. 21, 2016

(65) Prior Publication Data

US 2017/0013489 A1  Jan. 12, 2017

Related U.S. Application Data

(63) Continuation of application No. 14/361,252, filed as application No. PCT/KR2012/011001 on Dec. 17, 2012, now Pat. No. 9,467,881.

(Continued)

(51) Int. Cl.
*H04W 4/00* (2009.01)
*H04W 24/08* (2009.01)
(Continued)

(52) U.S. Cl.
CPC ............ *H04W 24/08* (2013.01); *H04J 11/00* (2013.01); *H04J 11/0023* (2013.01);
(Continued)

(58) Field of Classification Search
CPC .... H04W 24/08; H04W 72/042; H04W 88/02
(Continued)

(56) References Cited

U.S. PATENT DOCUMENTS

2011/0110251 A1  5/2011  Krishnamurthy et al.
2011/0255431 A1* 10/2011  Wang ................... H04L 5/0053
                                                                 370/252
(Continued)

FOREIGN PATENT DOCUMENTS

KR   10-2009-0069762   7/2009
KR   10-2009-0101406   9/2009
(Continued)

OTHER PUBLICATIONS

European Patent Office Application Serial No. 16188520.7, Search Report dated Nov. 14, 2016, 8 pages.

(Continued)

*Primary Examiner* — Farah Faroul
(74) *Attorney, Agent, or Firm* — Lee Hong Degerman Kang Waimey

(57) ABSTRACT

Disclosed are a method for measuring channel state information in a wireless access system that supports an environment in which an amount of uplink resource and an amount of downlink resource dynamically change, and an apparatus for the method. In detail, the method comprises: a step of receiving interference measurement resource information including information on the location of an interference measurement resource set in an uplink resource for interference measurement; a step of measuring interference being received from an adjacent cell at the location of the interference measurement resource a step of calculating channel state information using the measured interference value; and a step of transmitting the calculated channel state information to a base station.

12 Claims, 9 Drawing Sheets

Related U.S. Application Data

(60) Provisional application No. 61/576,356, filed on Dec. 16, 2011.

(51) Int. Cl.
| | | |
|---|---|---|
| *H04J 11/00* | (2006.01) | |
| *H04L 1/00* | (2006.01) | |
| *H04W 72/04* | (2009.01) | |
| *H04W 88/02* | (2009.01) | |

(52) U.S. Cl.
CPC ........ *H04J 11/0056* (2013.01); *H04L 1/0026* (2013.01); *H04W 72/042* (2013.01); *H04W 88/02* (2013.01)

(58) Field of Classification Search
USPC .......................................................... 370/252
See application file for complete search history.

(56) References Cited

U.S. PATENT DOCUMENTS

| | | | |
|---|---|---|---|
| 2012/0207040 A1 | 8/2012 | Comsa et al. | |
| 2012/0208547 A1 | 8/2012 | Geirhofer et al. | |
| 2013/0033998 A1* | 2/2013 | Seo | H04W 24/00 370/252 |
| 2013/0107832 A1 | 5/2013 | Kim et al. | |
| 2014/0016497 A1 | 1/2014 | Sec et al. | |
| 2014/0321313 A1 | 10/2014 | Seo et al. | |
| 2014/0369293 A1* | 12/2014 | Guo | H04L 5/0073 370/329 |
| 2015/0124663 A1* | 5/2015 | Chen | H04L 5/0053 370/278 |
| 2015/0189664 A1 | 7/2015 | Hu et al. | |
| 2015/0358098 A1 | 12/2015 | Nagata et al. | |

FOREIGN PATENT DOCUMENTS

| | | |
|---|---|---|
| KR | 10-2011-0122046 | 11/2011 |
| WO | 2009/035399 | 3/2009 |
| WO | 2009/052754 | 4/2009 |
| WO | 2010/049587 | 5/2010 |
| WO | 2012167431 | 12/2012 |
| WO | 2013100581 | 7/2013 |

OTHER PUBLICATIONS

Huawei, et al., "Discussion on evaluation of TDD DL-UL reconfiguration dependent on traffic adaptation," 3GPP TSG RAN WG1 Meeting #66, R1-112469, Aug. 2011, 8 pages.

3rd Generation Partnership Project (3GPP), "Technical Specification Group Radio Access Network; Evolved Universal Terrestrial Radio Access (E-UTRA); Physical layer procedures (Release 10)," 3GPP TS 36.213 V10.3.0, Sep. 2011, 122 pages.

European Patent Office Application Serial No. 12856809.4, Search Report dated Jul. 17, 2015, 7 pages.

PCT International Application No. PCT/KR2012/011001, Written Opinion of the International Searching Authority dated Mar. 28, 2013, 15 pages.

PCT International Application No. PCT/KR20121011001, Written Opinion of the International Searching Authority dated Mar. 28, 2013, 11 pages.

* cited by examiner

METHOD FOR MEASURING CHANNEL STATE INFORMATION IN A WIRELESS ACCESS SYSTEM AND APPARATUS FOR SAME

CROSS-REFERENCE TO RELATED APPLICATIONS

This application is a continuation of U.S. patent application Ser. No. 14/361,252, filed on May 28, 2014, now U.S. Pat. No. 9,467,881, which is the National Stage filing under 35 U.S.C. 371 of International Application No. PCT/KR2012/011001, filed on Dec. 17, 2012, which claims the benefit of U.S. Provisional Application No. 61/576,356, filed on Dec. 16, 2011, the contents of which are hereby incorporated by reference herein in their entirety.

TECHNICAL FIELD

The present invention relates to a wireless access system, and more particularly, a method for measuring channel state information in a wireless access system for supporting an environment in which amounts of uplink (UL) and downlink (DL) resources are dynamically changed, and an apparatus for supporting the method.

BACKGROUND ART

Mobile communication systems have been developed in order to provide voice services while ensuring the activity of users. However, a mobile communication system have gradually extended its field to data services as well as voice services and have been currently developed so as to provide high speed data services. However, in a mobile communication system that currently provides services, resources are insufficient and users require higher speed services, and thus, there has been a need for a more developed mobile communication system.

One of most important factors among requirements of a next-generation wireless access system is to support high data transfer rate requirement. To this end, researches have been conducted into various technologies such as multiple input multiple output (MIMO), cooperative multiple point transmission (CoMP), relay, etc.

A conventional wireless access system, because uplink (UL) resources and downlink (DL) resources are fixedly configured, even if UL and DL traffic are changed, traffic is processed within limited resources. However, in consideration of an environment in which an eNB dynamically changes the amounts of UL and DL resources according to the amount of UL and DL traffic, even UL resource can be used as DL resource, and even DL resource can be used as UL resource. In this situation, even if resource is configured for UL or DL, a UE needs to perform an appropriate operation according to use of the corresponding resource.

DISCLOSURE

Technical Problem

An object of the present invention devised to solve the problem lies in a method and apparatus for smoothly measuring a channel state between a user equipment (UE) and an eNB in a wireless access system, preferably, in a wireless access system for supporting an environment in which amounts of uplink (UL) and downlink (DL) resources are dynamically changed, and an apparatus for the method.

Another object of the present invention devised to solve the problem lies in a method and apparatus for accurately measure a channel state of resource that can be used for DL among resources configured as UL resources or a channel state of resource that can be used for UL among resources configured as DL resources, and an apparatus for the method.

It is to be understood that both the foregoing general description and the following detailed description of the present invention are exemplary and explanatory and are intended to provide further explanation of the invention as claimed.

Technical Solution

The object of the present invention can be achieved by providing a method for measuring channel state information by a user equipment (UE) in a wireless access system for supporting an environment in which amounts of uplink (UL) and downlink (DL) resources are dynamically changed, the method including receiving interference measurement resource information including location information of interference measurement resource configured as UL resource for interference measurement, measuring interference exerted by an adjacent cell at a location of the interference measurement resource, calculating the channel state information using the measured interference, and transmitting the calculated channel state information to an eNB.

In another aspect of the present invention, provided herein is a user equipment (UE) for measuring channel state information by a user equipment (UE) in a wireless access system for supporting an environment in which amounts of uplink (UL) and downlink (DL) resources are dynamically changed, the UE including a radio frequency (RF) unit for transmitting the channel state information and for transmitting and receiving a radio signal, and a processor for receiving interference measurement resource information including location information of interference measurement resource configured as UL resource for interference measurement, for measuring interference exerted by an adjacent cell at a location of the interference measurement resource, calculating the channel state information using the measured interference, and transmitting the calculated channel state information to an eNB.

The location information of the interference measurement resource may include at least one of subframe offset, a subframe period, a subframe index, and a symbol index.

The interference measurement resource may have any one form of a demodulation reference signal (DMRS), a sounding reference signal (SRS), a common reference signal (CRS), and a channel state information reference signal (CSI).

The interference measurement resource may be semi-statically configured via a radio resource control (RRC) signal.

The method may further include receiving indication information indicating that the interference measurement resource is valid.

The indication information may be an indicator for triggering aperiodic CSI reporting.

When a subframe included in the interference measurement resource is used for UL, nulling may be performed on a location of the interference measurement resource in a UL channel transmission region of other UEs except for the UE and rate matching may be applied to data to be transmitted through the UL channel.

The interference measurement resource may be configured using information about change in use of UL and DL of a subframe of an eNB of an adjacent cell, received from the eNB of the adjacent cell.

Advantageous Effects

According to embodiments of the present invention, a channel state between a user equipment (UE) and an eNB can be smoothly measured in a wireless access system, preferably, in a wireless access system for supporting an environment in which amounts of uplink (UL) and downlink (DL) resources are dynamically changed.

According to the embodiments of the present invention, a channel state of resource that can be used for DL among resources configured as UL resources or a channel state of resource that can be used for UL among resources configured as DL resources can be accurately measured.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
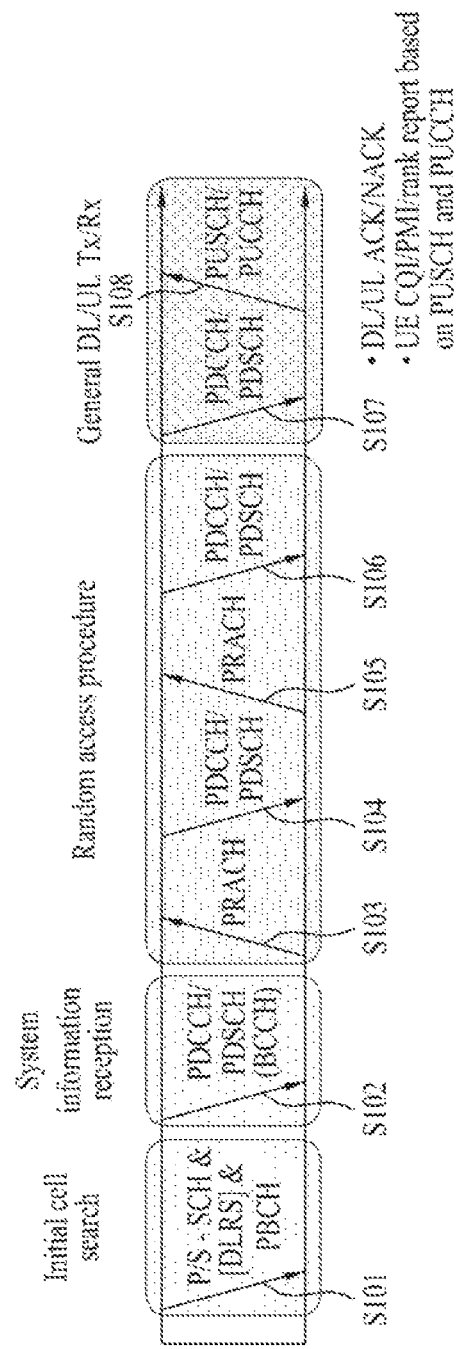
FIG. 1 illustrates physical channels and a general method for transmitting signals on physical channels in a $3^{rd}$ generation partnership project long term evolution (3GPP LTE) system.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be implemented according to the invention.

The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and important functions of the structures and devices are shown in block diagram form.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point (AP) as necessary. The term "relay" may be replaced with the terms relay node (RN) or relay station (RS). The term "terminal" may also be replaced with a user equipment (UE), a mobile station (MS), a mobile subscriber station (MSS), a subscriber station (SS), an advanced mobile station (AMS), a wireless terminal (WT), a machine-type communication (MTC) device, a machine-to-machine (M2M) device, or a device-to-device (D2D) device as necessary.

It should be noted that specific terms disclosed in the present invention are proposed for convenience of description and better understanding of the present invention, and the use of these specific terms may be changed to other formats within the technical scope or spirit of the present invention.

Exemplary embodiments of the present invention are supported by standard documents disclosed for at least one of wireless access systems including an institute of electrical and electronics engineers (IEEE) 802 system, a $3^{rd}$ generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (utra) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

For clarity, the following description focuses on IEEE 802.11 systems. However, technical features of the present invention are not limited thereto.

1. 3GPP LTE/LTE-A System to which the Present Invention is Applicable 1. 1. Overview of System FIG. 1 illustrates physical channels and a general method for transmitting signals on the physical channels in the 3GPP LTE system.

When a UE is powered on or enters a new cell, the UE performs initial cell search (S101). The initial cell search involves acquisition of synchronization to an eNB. Specifically, the UE synchronizes its timing to the eNB and acquires information such as a cell identifier (ID) by receiving a primary synchronization channel (P-SCH) and a secondary synchronization channel (S—SCH) from the eNB.

Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH (S102).

To complete access to the eNB, the UE may perform a random access procedure with the eNB (S103 to S106). In the random access procedure, the UE may transmit a preamble on a physical random access channel (PRACH) (S103) and may receive a response message to the preamble on a PDCCH and a PDSCH associated with the PDCCH (S104). In the case of a contention-based random access, the UE may additionally perform a contention resolution procedure including transmission of an additional PRACH (S105) and reception of a PDCCH signal and a PDSCH signal corresponding to the PDCCH signal (S106).

After the above procedure, the UE may receive a PDCCH and/or a PDSCH from the eNB (S107) and transmit a Physical Uplink Shared Channel (PUSCH) and/or a Physical Uplink Control Channel (PUCCH) to the eNB (S108), in a general UL/DL signal transmission procedure.

Control information that the UE transmits to the eNB is called uplink control information (UCI). The UCI includes hybrid automatic repeat and request acknowledgement/negative acknowledgement (HARQ-ACK/NACK), scheduling request (SR), channel quality indication (CQI), precoding matrix index (PMI), a rank indication (RI), etc.

In the LTE system, UCI is generally transmitted on a PUCCH periodically. However, if control information and traffic data should be transmitted simultaneously, they may be transmitted on a PUSCH. In addition, UCI may be transmitted periodically on the PUSCH, upon receipt of a request/command from a network.

Figure 2:
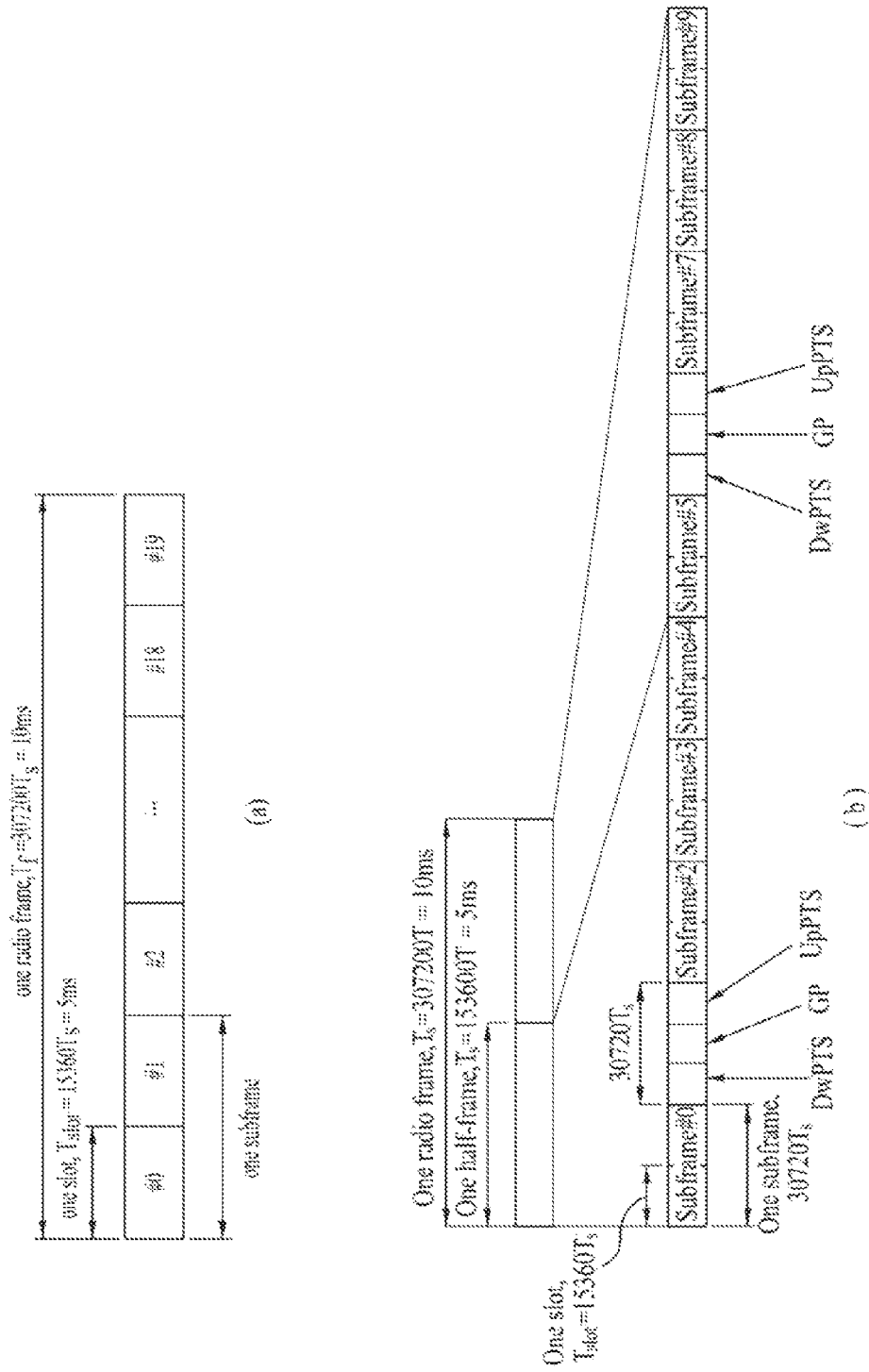
FIG. 2 illustrates a structure of a radio frame used in a 3GPP LTE.

FIG. 2 illustrates a structure of a radio frame used in a 3GPP LTE.

In a cellular orthogonal frequency division multiplexing (OFDM) wireless packet communication system, UL/DL data packets are transmitted in subframes. One subframe is defined as a predetermined time interval including a plurality of OFDM symbols. The 3GPP LTE standard supports a type 1 radio frame structure applicable to frequency division duplex (FDD) and a type 2 radio frame structure applicable to time division duplex (TDD).

FIG. 2(a) is a diagram illustrating the structure of the type 1 radio frame. A DL radio frame includes 10 subframes, each subframe including two slots in the time domain. A time required for transmitting one subframe is defined as a transmission time interval (TTI). For example, one subframe may be 1 ms long and one slot may be 0.5 ms long. One slot includes a plurality of OFDM symbols in the time domain and a plurality of resource blocks (RBs) in the frequency domain. Since the 3GPP LTE system uses OFDMA for DL, an OFDM symbol may be one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a cyclic prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is instable as is the case with a fast UE, the extended CP may be used in order to further reduce inter-symbol interference.

In the case of the normal CP, since one slot includes 7 OFDM symbols, one subframe includes 14 OFDM symbols. Up to first three OFDM symbols of each subframe may be allocated to a PDCCH and the remaining OFDM symbols may be allocated to a PDSCH.

FIG. 2(b) illustrates the structure of the type 2 radio frame. The type 2 radio frame includes two half frames, each half frame including 5 subframes, a downlink pilot time slot (DwPTS), a guard period (GP), and an uplink pilot time slot (UpPTS). One subframe is divided into two slots. The DwPTS is used for initial cell search, synchronization, or channel estimation at a UE, and the UpPTS is used for channel estimation and UL transmission synchronization with a UE at an eNB. The GP is used to cancel UL interference between UL and DL, caused by the multi-path delay of a DL signal.

UL-DL configuration of the type 2 radio frame structure of a TDD system refers to a rule indicating whether UL and DL are allocated (or reserved) to all subframes. Table 1 shows an exemplary uplink-downlink configuration.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 3 above, for each respective subframe of a radio frame, "D" denotes a downlink subframe, "U" denotes an uplink subframe, and "S" denotes a special subframe including three fields of a DwPTS, a GP, and a an UpPTS. The UL-DL configuration may be classified into 7 types, and for each respective configurations, the locations and numbers of DL subframes, special subframes, and UL subframes are varied.

A point in time for converting DL into UL or a pint in time for converting UL into DL is referred to as a switching point. A switch-point periodicity refers to a period with which an operation of conversion between a UL subframe and a DL subframe is repeated and supports both 5 ms and 10 ms. When the switch-point periodicity is 5 ms, a special subframe S is present every half-frame. When the switch-point periodicity is 10 ms, a special subframe S is present only in a first half-frame.

In all configurations, subframes #0 and #5 and a DwPTS are period for DL transmission only. The UpPTS, a subframe, and a subframe immediately subsequent thereto are always periods for UL transmission.

The UL-DL configuration may be system information and may be known to both an eNB and a UE. Whenever UL-DL configuration information is changed, the eNB may transmit only an index of configuration information to notify the UE of information about change in UL-DL allocation state of a radio frame. In addition, the configuration information may be transmitted as a type of DL control information through a physical downlink control channel (PDCCH) and may be commonly transmitted as a type of broadcast information to all UEs in a cell through a broadcast channel like other scheduling information and The aforementioned radio frame structure is purely exemplary. The number of subframes included in a radio frame or the number of slots included in each subframe, and the number of symbols of each slot can be changed in various ways.

Figure 3:
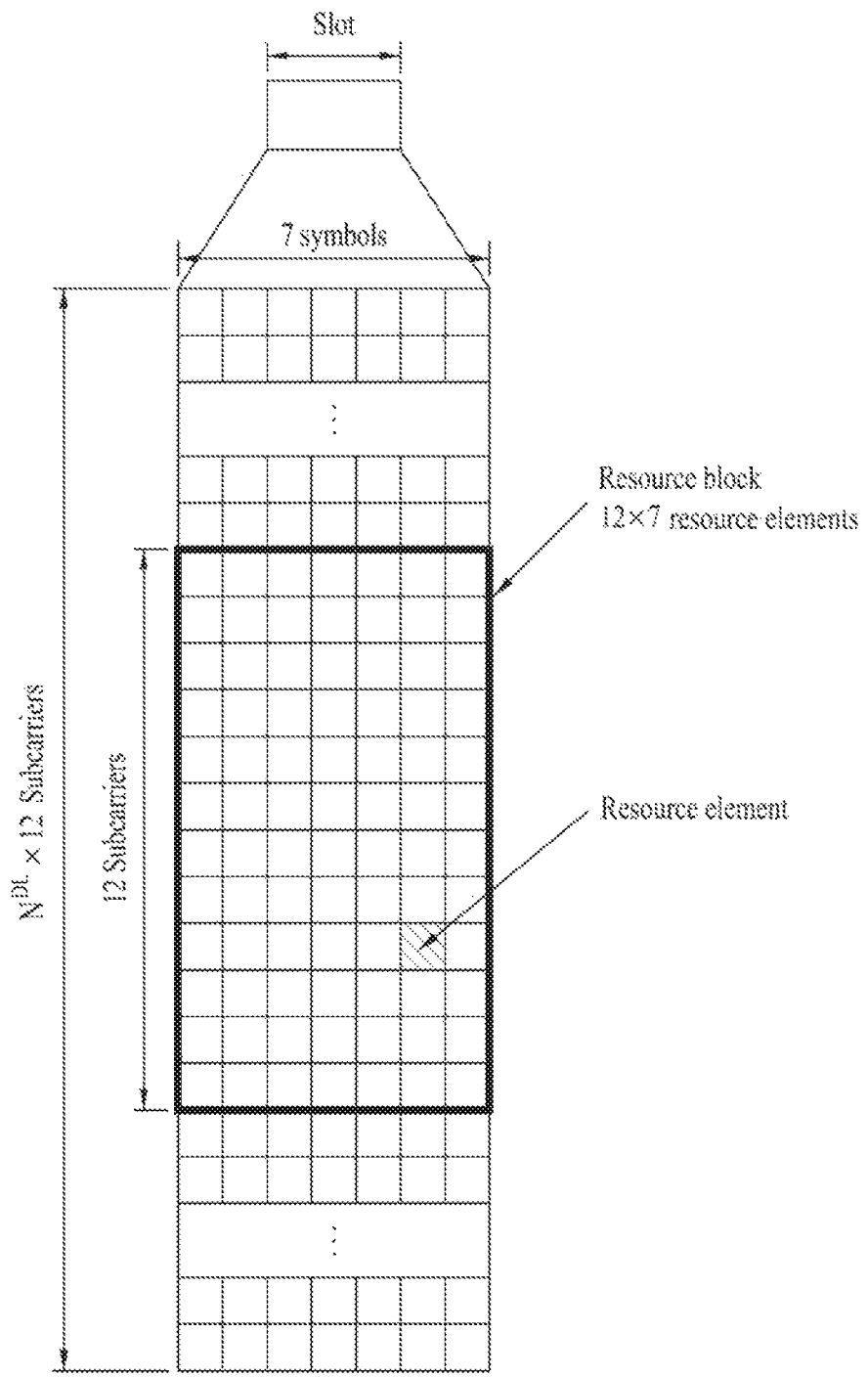
FIG. 3 illustrates the structure of a downlink (DL) resource grid for the duration of one DL slot.

FIG. 3 illustrates the structure of a DL resource grid for the duration of one DL slot.

Referring to FIG. 3, one DL slot includes a plurality of OFDM symbols in the time domain Here, one DL slot includes 7 OFDM symbols and one resource block includes 12 subcarriers in the frequency symbol, which is purely exemplary, but embodiments of the present invention are not limited thereto.

Each element of the resource grid is referred to as a resource element (RE). An RB includes 12×7 REs. The number of RBs in a DL slot, $N^{DL}$ depends on a DL transmission bandwidth. A UL slot may have the same structure as a DL slot.

Figure 4:
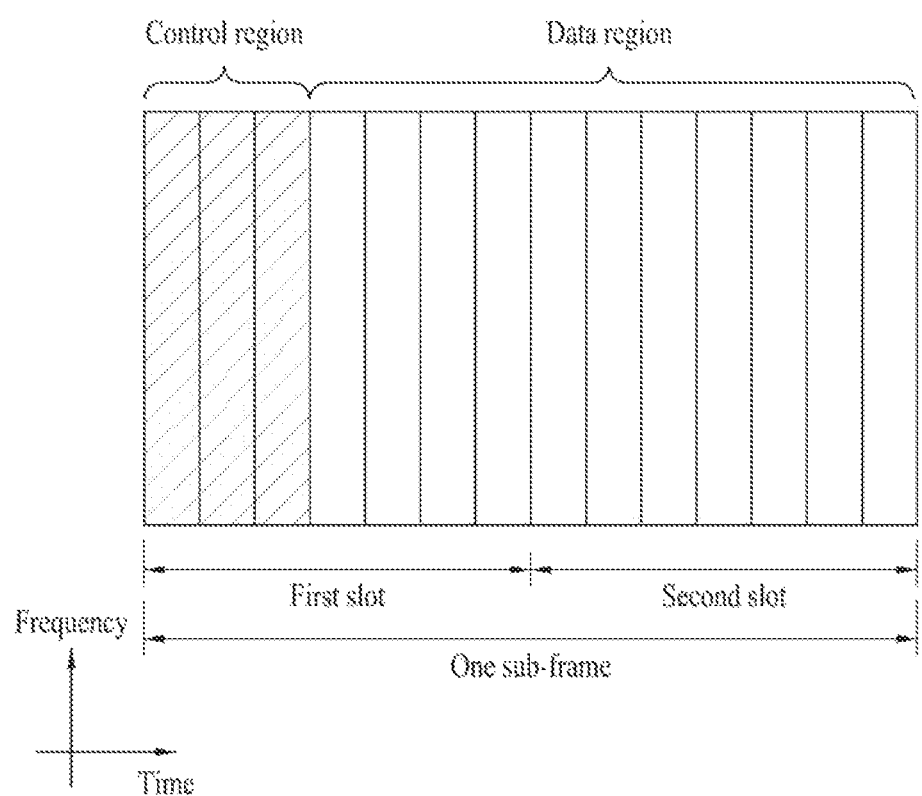
FIG. 4 illustrates a structure of a DL subframe.

FIG. 4 illustrates a structure of a DL subframe.

Referring to FIG. 4, up to three or four OFDM symbols at the start of the first slot of a DL subframe are used as a control region to which control channels are allocated and the other OFDM symbols of the DL subframe are used as a data region to which a PDSCH is allocated. DL control channels defined for the 3GPP LTE system include a physical control format indicator channel (PCFICH), a physical downlink control channel (PDCCH), and a physical hybrid-ARQ indicator channel (PHICH).

The PCFICH is located in the first OFDM symbol of a subframe, carrying information about the number of OFDM symbols used for transmission of control channels in the subframe. The PHICH delivers an HARQ ACK/NACK signal as a response to a UL transmission. Control information carried on the PDCCH is called downlink control information (DCI). The DCI transports resource allocation information and other control information for a UE or a UE group. For example, the DCI includes DL/UL scheduling information, UL transmission (Tx) power control commands, etc.

The PDCCH delivers information about resource allocation and a transport format for a downlink shared channel (DL-SCH), information about resource allocation and a transport format for an uplink shared channel (UL-SCH), paging information of a paging channel (PCH), system information on the DL-SCH, information about resource allocation for a higher-layer control message such as a random access response transmitted on the PDSCH, a set of Tx power control commands for individual UEs of a UE group, Tx power control commands, voice over Internet protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of RE groups (REGs). The format of a PDCCH and the number of available bits for the PDCCH are determined according to the number of CCEs and a coding rate provided by the CCEs.

An eNB determines a PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is destined for a specific UE, the CRC may be masked by a cell-RNTI (C-RNTI) of the UE. If the PDCCH carries a paging message, the CRC of the PDCCH may be masked by a paging indicator identifier (P-RNTI). If the PDCCH carries system information, particularly, a system information block (SIB), its CRC may be masked by a system information ID and a system information RNTI (SI-RNTI). To indicate that the PDCCH carries a random access response to a random access preamble transmitted by a UE, its CRC may be masked by a random access-RNTI (RA-RNTI).

Figure 5:
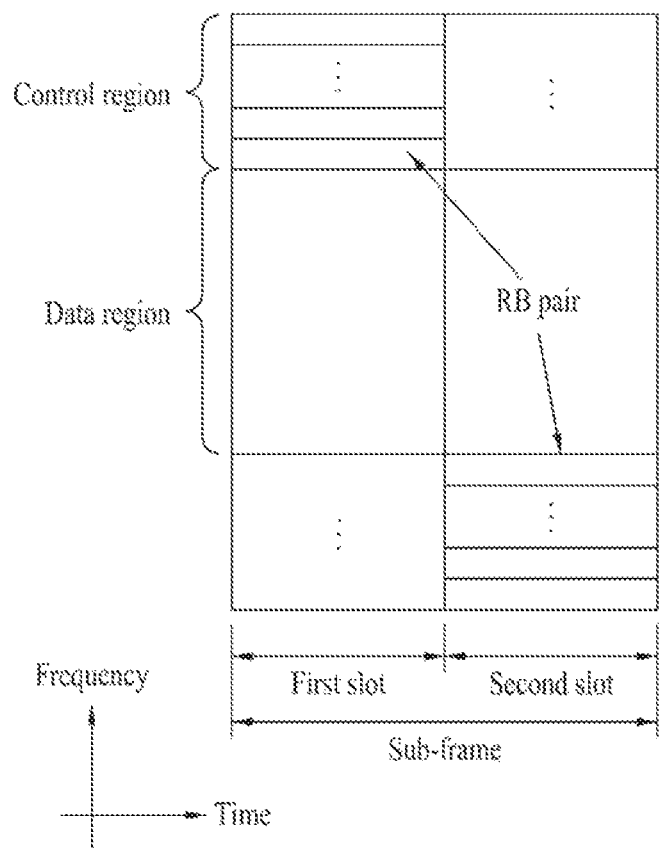
FIG. 5 illustrates a structure of an uplink (UL) subframe.

FIG. 5 illustrates a structure of a UL subframe.

Referring to FIG. 5, a UL subframe may be divided into a control region and a data region in the frequency domain. The control region includes a PUCCH that carriers UL control information. The data region includes a PUSCH that carrier user data. In order to maintain single carrier wave properties, one UE may not simultaneously transmit a PUCCH and a PUSCH. An RB pair is allocated to a PUCCH of one UE in a subframe. RBs included in an RB pair occupy different subcarriers in two respective slots. The RB pair allocated to the PUCCH frequency-hops over a slot boundary.

1. 2. DL Measurement

In a mobile communication system, a packet (or signal) is transmitted on a radio channel from a transmitter to a receiver. In view of the nature of the radio channel, the packet may be distorted during the transmission. To receive the signal successfully, the receiver should compensate for the distortion in the received signal using channel information. Generally, to enable the receiver to acquire the channel information, the transmitter transmits a signal known to both the transmitter and the receiver and the receiver acquires knowledge of channel information based on the distortion of the signal received on the radio channel. The signal known to both the transmitter and receiver is referred to as a pilot signal or a reference signal (RS).

In transmission and reception of data using multiple antennas, the receiver needs to know channel states between transmit antennas and receive antennas to successfully receive a signal. Accordingly, a separate reference signal is needed for each transmit antenna.

In a wireless communication system, an RS can be largely classified into two types according to its purpose. The RS includes an RS for channel information acquisition and an RS for data demodulation. The former is used for acquisition of channel information to DL by a UE. Thus the former RS needs to be transmitted in a wideband, and even a UE that does not receive DL data in a specific subframe needs to receive and measure the RS. In addition, the RS for channel measurement may also be used for measurement of handover, etc. The latter is an RS that is transmitted together with corresponding resource when an eNB transmits a DL signal. In this regard, the UE can receive the corresponding RS to estimate a channel and accordingly demodulate data. The RS for data demodulation needs to be transmitted in a region in which data is transmitted.

A 3GPP LTE system defines a common reference signal (CRS) shared by all UEs in a cell and a dedicated reference signal (DRS) for a specific UE only as a DL RS. The CRS may be used for both channel information acquisition and data demodulation and may also be referred to as a cell-specific RS. An eNB transmits the CRS every subframe over a wideband. On the other hand, the DRS may be used for data demodulation only and may be transmitted through REs when data modulation on a PDSCH is required. The UE may receive whether the DRS is present through a higher layer and determines that the DRS is valid only when the corresponding PDSCH is mapped. The DRS may be referred to as a UE-specific RS or a demodulation RS (DMRS).

A receiver (UE) may estimate a channel state from the CRS and feedback an indicator associated with channel quality, such as a channel quality indicator (CQI), a precoding matrix index (PMI), and/or a rank indicator (RI) to a transmitter (eNB). In addition, the receiver may define an RS associated with feedback of channel state information (CSI) such as CQI/PMI/RI as a separate CSI-RS. A CSI-RS for channel measurement is designed mainly for channel measurement unlike an existing CRS used for data demodulation as well as channel measurement, etc. Since the CSI-RS is transmitted only for transmission of information about a channel state, the eNB transmits CSI-RSs about all antenna ports. In addition, the CSI-RS is transmitted for knowledge of DL channel information and thus is transmitted over all bands unlike a DRS.

A current 3GPP LTE system defines two types of a closed-loop MIMO transmission scheme and an open-loop MIMO scheme managed without channel information of the receiver. In the closed-loop MIMO, in order to achieve multiplexing gain of a MIMO antenna, each of the transmitter and the receiver performs beamforming based on channel information, that is, channel state information (CSI). The eNB may command the UE to allocate a physical uplink control channel (PUCCH) or a physical uplink shared channel (PUSCH) and to feedback DL CSI in order to acquire CSI from the UE.

CSI is classified largely into three information types, a rank indicator (RI), a precoding matrix index (PMI), and a channel quality indication (CQI).

An RI is information about a channel rank that is the number of signal streams (or layers) that a UE can receive in the same time-frequency resources. Because the RI is determined dominantly according to the long-term fading of a channel, the RI may be fed back to an eNB in a longer period than a PMI and a CQI.

A PMI is the index of a UE-preferred eNB precoding matrix determined based on a metric such as signal to interference and noise ratio (SINR), reflecting the spatial characteristics of channels. The PMI reflects channel spatial characteristics and indicates a precoding index of an eNB preferred by a UE based on a metric such as a signal to interference plus noise ratio (SINR), etc. That is, the PMI is information about a precoding matrix used for transmitted from a transmitter. The precoding matrix fed back from a received is determined in consideration of the number of a layer indicted by an RI. The PMI may be fed back in case of closed-loop spatial multiplexing (SM) and large delay cyclic delay diversity (CDD). In the case of open-loop transmission, the transmitter may select a precoding matrix according to predetermined rules. A process for selecting a PMI for each rank is as follows. The receiver may calculate a post processing SINR in each PMI, convert the calculated SINR into the sum capacity, and select the best PMI on the basis of the sum capacity. That is, PMI calculation of the receiver may be considered to be a process for searching for an optimum PMI on the basis of the sum capacity. The transmitter that has received PMI feedback from the receiver may use a precoding matrix recommended by the receiver. This fact may be contained as a 1-bit indicator in scheduling allocation information for data transmission to the receiver. Alternatively, the transmitter may not use the precoding matrix indicated by a PMI fed back from the transmitter. In this case, precoding matrix information used for data transmission from the transmitter to the receiver may be explicitly contained in the scheduling allocation information.

A CQI represents a channel strength and in general reflects a reception SINR that the eNB can achieve with a PMI. A UE reports CQI index to an eNB. The CQI index indicates a specific combination of a set including combination of a predetermined modulation scheme and code rate.

In an evolved communication system such as LTE-A, additional multi-user diversity gain is obtained using multi-user MIMO (MU-MIMO). The MU-MIMO technology refers to a method of a scheme in which an eNB assigns antenna resources to different UEs and selects and schedules a UE that can have a high data transfer rate for each antenna. For the multi-user diversity gain, higher accuracy is required from a viewpoint of a channel feedback. Since interference is present between UEs multiplexed in the antenna domain in MU-MIMO, accuracy of CSI may largely affect not only a UE that reports the CSI but also interference of other multiplexed UEs. Accordingly, in order to enhance the accuracy of a feedback channel in LTE-A system, a final PMI may be determined to be divided into W1 corresponding to a long-term and/or wideband PMI and W2 corresponding to a short-term and/or subband PMI and may be determined as a combination of W1 and W2.

For example, the long-term covariance matrix of channels expressed as [Equation 1] may be used for hierarchical codebook transformation that configures one final PMI with W1 and W2 from information of two channels.

$$W=\text{norm}(W1\,W2) \quad\quad\quad \text{[Equation 1]}$$

In [Equation 1], W2 is a short-term PMI, which is a codeword of a codebook reflecting short-term channel information, W1 is a long-term covariance matrix, and norm(A) is a matrix obtained by normalizing the norm of each column of matrix A to 1. W is a codeword of a final transformed codebook. Conventionally, W1 and W2 are given according to [Equation 2] below.

$$W1(i) = \begin{bmatrix} X_i & 0 \\ 0 & X_i \end{bmatrix}, \text{ where } X_i \text{ is } Nt/2 \text{ by } M \text{ matrix.} \quad \text{[Equation 2]}$$

$$W2(j) = \overbrace{\begin{bmatrix} e_M^k & e_M^l & \cdots & e_M^m \\ \alpha_j e_M^k & \beta_j e_M^l & \cdots & \gamma_j e_M^m \end{bmatrix}}^{r \text{ columns}} \text{ (if rank = } r\text{),}$$

where $1 \leq k, l, m \leq M$ and $k, l, m$ are integer.

In [Equation 2] above, the codewords are designed so as to reflect correlation characteristics between established channels, if cross polarized antennas are arranged densely (for example, the distance between adjacent antennas is equal to or less than a half of a signal wavelength. The cross polarized antennas may be divided into a horizontal antenna group and a vertical antenna group and the two antenna groups are co-located, each having the property of a uniform linear array (ULA) antenna. Therefore, the correlations between antennas in each group have the same linear phase increment property and the correlation between the antenna groups is characterized by phase rotation. Since a codebook is eventually quantized values of channels, it is necessary to design a codebook, reflecting channel characteristics. For the convenience of description, a rank-1 codeword designed according to [Equation 2] may be given as [Equation 3] below.

$$W1(i) * W2(j) = \begin{bmatrix} X_i(k) \\ \alpha_j X_i(k) \end{bmatrix} \quad \text{[Equation 3]}$$

In [Equation 3] above, a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. Preferably, $X_i(k)$ is expressed as a vector having the linear phase increment property, reflecting the correlation characteristics between antennas in each antenna group. For example, a discrete Fourier transform (DFT) matrix may be used for $X_i(k)$.

Higher accuracy is required for CoMP. In the case of CoMP JT, a plurality of eNBs collaboratively transmits the same data to a specific UE, and thus, a CoMP JT system may be academically considered as a MIMO system in which antennas are geographically distributed. That is, when the JT performs MU-MIMO, high level channel accuracy is also required in order to prevent co-scheduled UEs like single cell MU-MIMO. In the case of CoMP CB, accurate channel information is also required in order to prevent interference to a serving cell by an adjacent cell.

Recently, active research has been conducted into enhanced inter-cell interference coordination (eICIC) as an interference coordination method between UEs in a 3GPP LTE-A system. The eICIC is one of interference coordination methods. In this regard, according to the eICIC, a cell causing interference is defined as an aggressor cell or a primary cell, an interfered cell is defined as a victim cell or a secondary cell, the aggressor cell stops data transmission in some specific resource regions such that a UE can maintain access to the victim cell or secondary cell in the corresponding resource region. That is, time domain inter-cell interference coordination by which an aggressor cell uses a silent subframe that reduces transmission power/activity of some physical channels (including operation of setting zero power) and a victim cell schedules UEs in consideration of the silent frame can be used. The silent subframe may also be called an almost blank subframe (ABS). In this case, from a viewpoint of a UE positioned in the victim cell, an interference level largely changes according to whether the silent subframe is present, and signals transmitted from the aggressor cell and the victim cell may act as interference to a UE positioned at a boundary between the aggressor cell and the victim cell.

In this situation, to perform more accurate radio link monitoring (RLM) in each subframe or radio resource management (RRM) for measuring reference signal received power (RSRP)/reference signal received quality (RSRQ) or to measure channel state information (CSI) for link adaptation, the aforementioned monitoring/measurement needs to be limited to subframe sets having uniform interference characteristics.

In 3GPP LTE system, the following restricted RLM and RRM/CSI measurement is defined.

1) RLM

The DL radio link quality may be monitored by a physical layer of a UE in order to indicate an 'out-of-sync' or 'in-sync' status to higher layers.

In the case of a non-discontinuous reception (DRX) mode operation, the physical layer in the UE compares a value measured over a previous time period every radio frame with thresholds ($Q_{out}$ and $Q_{in}$) to monitor radio link quality. On the other hand, in the case of a DRX mode operation, the physical layer in the UE compares a value measured over a previous time period every DRX period at least once to monitor radio link quality. Here, if higher layer signaling indicates specific subframes for restricted radio link monitoring, the radio link quality is not monitored by other subframes other than the indicated subframes.

The physical layer in the UE indicates 'out-of-sync' to higher layers when the radio link quality is worse than the threshold $Q_{out}$ in radio frames in which the radio link quality is assessed. That is, the 'out-of-sync' indication is an event that occurs when a UE measures the channel quality of a signal from a serving eNB and the channel quality is degraded to a predetermined level or less. Here, the channel quality may be measured from a signal-to-noise ratio (SNR) measured using a cell-specific reference signal (CRS) of a DL signal from the eNB. In addition, the 'out-of-sync' indication may be provided to higher layers when a PDCCH received from lower layers (physical layers) cannot be demodulated or signal-to-interference plus noise ratio (SINR) is low.

On the other hand, when the physical layer in the UE is better than the threshold $Q_{in}$ in radio frames in which the radio link quality is assessed, 'in-sync' is indicated to higher layers. That is, the 'in-sync' indication is an event that occurs when a UE measures the channel quality of a signal from a serving eNB and the channel quality is increased to a predetermined level or more.

2) Channel Quality Indicator (CQI)

CQI is information regarding channel quality. CQI may be represented by a predetermined MCS combination. CQI index may be given as shown in Table 2 below.

Table 2 shows CQI index.

TABLE 2

| CQI index | modulation | code rate × 1024 | efficiency |
|---|---|---|---|
| 0 | | out of range | |
| 1 | QPSK | 78 | 0.1523 |

TABLE 2-continued

| CQI index | modulation | code rate × 1024 | efficiency |
|---|---|---|---|
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Table 3 below shows a PDSCH transmission scheme for CSI reference resource.

TABLE 3

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity If the UE is configured with PMI/RI reporting: closed-loop spatial multiplexing |
| 9 | If the UE is configured without PMI/RI reporting: if the number of PBCH antenna ports is one, single-antenna port, port 0; otherwise transmit diversity Closed-loop spatial multiplexing with up to 8 layer transmission, ports 7-14 (see subclause 7.1.5B) |

Referring to Table 2 above, CQI index may be represented by 4 bits (i.e., CQI indexes of 0-15). Each CQI index may indicate a modulation scheme and a code rate.

A 3GPP LTE/LTE-A system defines that the following assumptions are considered in order to calculate CQI index by a UE from CSI reference resource.

(1) The first three OFDM symbols in one subframe are occupied by control signaling.

(2) Resource elements (REs) used by a primary synchronization signal, a secondary synchronization signal or a physical broadcast channel (PBCH) are not present.

(3) CP length of a non-MBSFN subframe is assumed.

(4) Redundancy version is set to zero (0).

(5) In the case of CSI reporting in transmission mode 9, when a UE configures PMI/RI reporting, DMRS overhead is the same as most recently reported rank.

(6) REs used for CSI-RS and zero-power CSI-RS are not present.

(7) REs used for Positioning Reference Signal (PRS) are not present.

(8) PDSCH transmission method may be dependent upon a current transmission mode (e.g., a default mode) configured in a UE and given according to Table 3 above.

(9) The ratio of PDSCH EPRE (energy per resource element) to a cell-specific reference signal EPRE may be given with the exception of $\rho_A$. (A detailed description of $\rho_A$ may follow the following assumption. Provided that a UE for an arbitrary modulation scheme may be set to transmission mode 2 having four cell-specific antenna ports or may be set to transmission mode 3 having an RI of 1 and four cell-specific antenna ports, $\rho_A$ may be denoted by $\rho_A = P_A + \Delta_{offset} + 10 \log_{10}(2)[dB]$. In the remaining cases, in association with an arbitrary modulation method and the number of arbitrary layers, $\rho_A$ may be denoted by $\rho_A = P_A + \Delta_{offset}[dB]$. $\Delta_{offset}$ is given by a nomPDSCH-RS-EPRE-Offset parameter configured by higher layer signaling.)

Definition of the above-mentioned assumptions may indicate that CQI includes not only information regarding channel quality but also various information of a corresponding UE. That is, different CQI indexes may be fed back according to a throughput or performance of the corresponding UE at the same channel quality, so that it is necessary to define a predetermined reference for the above-mentioned assumption.

Conventional RLM/RRM measurement on a serving cell is performed using a CRS. However, since precoding is applied in a transmission mode (e.g., transmission mode 9) using a DMRS, the RLM/RRM measurement may be different from measurement on link in which actual transmission is performed. Accordingly, when a PMI/RI reporting mode is configured in transmission mode 9, the UE performs channel measurement in order to calculate a CQI value based on a CSI reference signal only. On the other hand, when the PMI/RI reporting mode is not configured in transmission mode 9, the UE performs channel measurement for CQI calculation based on the CRS.

A procedure in which the UE recognizes a channel state to obtain a proper MCS may be designed in various ways for embodiment of the UE. For example, the UE may calculate a channel state or valid signal-to-interference plus noise ratio (SINR) using a reference signal. In addition, the channel state or the valid SINR can be measured on an entire system bandwidth (which is referred to as set S) or on a partial bandwidth (specific subband or specific RB). CQI of the entire system bandwidth (set S) may be referred to as a wideband (WB) CQI and CQI of the partial bandwidth may be referred to as a subband (SB) CQI. The UE may obtain the highest MCS based on the calculated channel state or valid SINR. The highest MCS refers to MCS satisfying the assumption of the CQI calculation in which a decoding transfer block error rate does not exceed 10%. The UE may determine a CQI index associated with the calculated MCS and report the determined CQI index to the eNB.

In an LTE/LTE-A system, CSI reference resource for CSI feedback/report is defined. The CSI reference resource is defined as a group of DL physical resource blocks (PRBs) corresponding to a frequency band associated with the calculated CQI in the frequency domain. In addition, the CSI reference resource is defined as a single DL subframe $n-n_{CQI\_ref}$ in the time domain. Here, n is a UL subframe index for CSI transmission/report.

In the case of periodic CSI reporting, $n_{CQI\_ref}$ has a smallest value corresponding to a valid DL subframe among values equal to or more than 4. That is, $n_{CQI\_ref}$ corresponds to a valid DL subframe that is most close to a UL subframe for CSI reporting among at least $4^{th}$ previous subframes in a UL subframe for CSI reporting. In addition, in the case of aperiodic CSI reporting, the CSI reference resource may be the same as a valid DL subframe in which corresponding CSI request in UL DCI format (e.g., DCI format 0) is transmitted. In addition, in the aperiodic CSI reporting, when the corresponding CSI request is transmitted in random access response grant in the DL subframe n-n$_{CQI\_ref}$, n$_{CQI\_ref}$ is 4.

In addition, when CSI subframe sets ($C_{CSI,0}$, $C_{CSI,1}$) are configured for a corresponding UE by a higher layer, each CSI reference resource may be included in any one of two subframe sets ($C_{CSI,0}$, $C_{CSI,1}$) but cannot be included in the both subframes.

A DL subframe can be valid if i) it is configured as a DL subframe for a corresponding UE, ii) it is not a multicast-broadcast single frequency network (MBSFN) subframe except for transmission mode 9, iii) it does not contain a DwPTS field when a length of the DwPTS in a special subframe of a TDD system is equal to or less than a predetermined length, iv) it is not contained in a measurement gap configured for the corresponding UE, and vi) it is an element of the CSI subframe set associated with the periodic CSI report when the UE is configured with CSI subframes sets for periodic CSI reporting. On the other hand, if there is not valid DL subframe for the CSI reference resource, CSI reporting is omitted in UL subframe n.

3) Radio Resource Management (RRM)

Measurement for RRM may be largely classified into reference signal received power (RSRP), reference signal received quality (RSRQ), etc., and the RSRQ may be measured via a combination of RSRP and E-UTRA carrier received signal strength indicator (RSSI).

The RSRP is defined as a linear average of power distribution of resource elements in which a cell-specific reference signal (CRS) is transmitted in a measurement frequency band. For RSRP determination, a cell-specific reference signal (R0) corresponding to antenna port '0' may be used. For RSRP determination, a cell-specific reference signal (R1) corresponding to antenna port '1' may be further used. When reception diversity is used by the UE, the reported value may not be smaller than the corresponding RSRP of individual diversity branch. For RSRP determination, a measurement frequency band used by the UE and the number of resource elements used in a measurement period may be determined by the UE as long as corresponding accuracy requirements are satisfied. In addition, power per resource element may be determined from energy from a portion of a symbol except for a cyclic prefix (CP).

Reference signal received quality (RSRQ) is defined as N×RSRP/E-UTRA carrier received signal strength indicator (RSSI). Here, N is the number of resource blocks (REs) of an E-UTRA carrier RSSI measurement band. In addition, in the aforementioned formula, measurement of the numerator and the denominator may be achieved from a set of the same RB set.

The E-UTRA carrier RSSI includes a linear average of total reception power detected from all sources including a serving cell and non-serving cell of a co-channel, adjacent channel interference, thermal noise, etc. in OFDM symbols containing a reference symbol corresponding to antenna port '0' over N resource blocks in a measurement band. On the other hand, when specific subframes for performing RSRQ measurement are indicated via higher layer signaling, the RSSI is measured via all OFDM symbols in the indicated subframes. When reception diversity is used by the UE, the reported value may not be smaller than the corresponding RSRP of individual diversity branch.

2. Channel State Information Measurement Method

The present invention proposes an effective interference measurement method for calculation of channel state information (CSI) by a UE in a situation in which an eNB dynamically changes the amount of UL resource and DL resource according to the volume of UL and DL traffic. Here, resource configured as UL resource refers to a UL band in an FDD system and refers to a UL subframe in a TDD system. On the other hand, resource configured as DL resource refers to a DL band in an FDD system and refers to a DL subframe in a TDD. In addition, the dynamic change in the amount of UL and DL resources means that resource configured as UL resource is temporarily used for DL transmission when the volume of DL traffic is high, or vice versa. For example, when an eNB notifies a plurality of un-specific UEs of information indicating that a specific subframe is configured as a UL subframe, if the volume of DL traffic is high, the eNB may temporarily notify a specific UE of information indicating that the corresponding subframe is converted to be used for DL transmission.

In an environment in which the amount of UL and DL resources is dynamically changed, since it is possible to potentially perform DL transmission on even UL resource, an UE needs to calculate a CRI for UL resource on which DL transmission is performed and to report the calculated CSI to an eNB. As described above, the UE can measure a reception signal when the UE calculates the CSI. In this regard, for SINR calculation, signal components and interference components (or interference or noise components) need to be estimated. That is, the CSI needs to be calculated based on interference observed by the UE in UL resource in which DL transmission can be performed, and thus, the eNB needs to appropriately determine resource used by the UE so that the UE can appropriately perform the aforementioned interference measurement.

Hereinafter, for convenience of description, a detailed description has been given assuming that the eNB temporarily uses resource configured as UL resource for DL transmission. However, embodiments of the present invention are not limited thereto. That is, the present invention can also be applied to the case in which resource configured as DL resource may be temporarily used for UL transmission. In addition, it is assumed that a boundary of UL/DL subframes with an adjacent cell is aligned.

Figure 6:
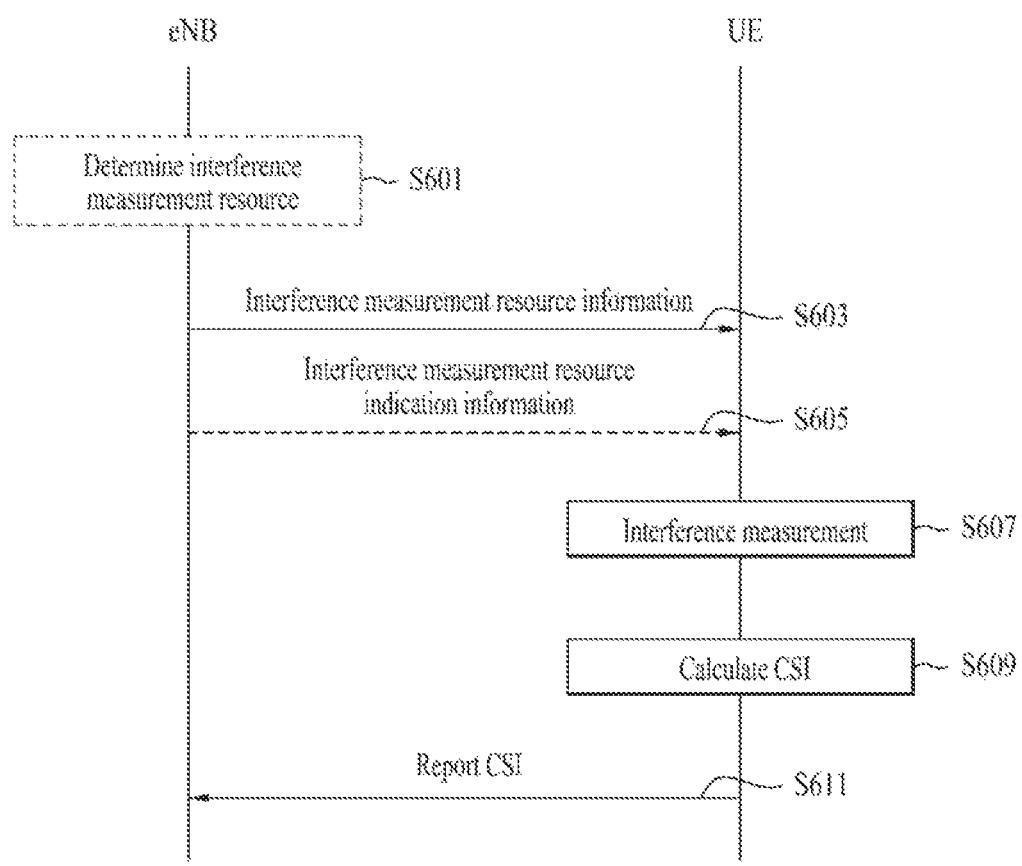
FIG. 6 is a diagram illustrating an example of a channel state information measuring method according to an embodiment of the present invention.

FIG. 6 is a diagram illustrating an example of a channel state information measuring method according to an embodiment of the present invention.

Referring to FIG. 6, an eNB configures interference measurement resource for measurement of interference as background information for reporting CSI by a UE in UL resource (S601). The eNB may receive information about change in use of a subframe of the corresponding eNB to DL from UL from the eNB of an adjacent cell to configure interference measurement resource. That is, the eNB can configure interference measurement resource for a specific UE in subframes, change in use of which is not serious, such that the corresponding eNB can more accurately measure interference from an adjacent cell. Step S601 will be described in detail in 2. 3. below.

The interference measurement resource can be fixedly configured and in this case, step S601 may be omitted.

The eNB transmits interference measurement resource information for measurement of interference by the configured UE to the UE (S603). Here, the interference measurement resource information may include location information, etc. of the configured interference measurement resource, and the interference measurement resource may be semi-statically or dynamically configured and transmitted via a physical layer signal or a higher layer signal. Step S603 will be described in detail in 2. 1. below.

Then the eNB transmits, to the UE, interference measurement resource indication information indicating whether corresponding interference measurement resource on which the UE will perform interference measurement is valid among configured interference measurement resources (S605). Here, when the interference resource is semi-statically configured, the interference measurement resource indication information may indicate whether interference measurement resource contained in a specific subframe is valid. However, when the interference measurement resource is dynamically configured, the indication information may not be transmitted to the UE, and the UE may implicitly consider that the configured interference measurement resource is valid through the interference measurement resource information in step S603. In this case, step S605 may be omitted. Step S605 will be described in detail in 2. 2. below.

The UE measures interference from an adjacent cell in valid interference measurement resource (S607) and calculates CSI using the measured interference (S609). Here, a period in which the UE measures the CSI may be limited to one subframe and may include a plurality of subframes. When the CSI measurement period includes a plurality of subframes, the UE may calculate an average value of the CSI measured every subframe or with a predetermined period in the corresponding period.

Steps S607 and S609 will be described in detail in 2. 1. and 2. 2. below.

Then the UE reports the calculated CSI to the eNB (S611). As described above, when the CSI measurement period contains a plurality of subframes, the UE may report an average value of the calculated CSI to the eNB.

When the eNB dynamically changes use of resource configured as UL (or DL) resource for UL resource and DL resource and uses the configured resource, scheduling restriction can be limited in Tx-Rx switching time in which resource used for UL and resource used for DL are changed. For example, when a next subframe (n+1) of a specific subframe (n) is used for DL in resource configured as UL resource (or when a next subframe is not scheduled for UL transmission), scheduling may be limited in a last symbol of the corresponding subframe (n). In addition, in the subframe (n+1) used for DL, scheduling may also be limited in a last symbol of the corresponding subframe (n+1).

Hereinafter, a channel state information measurement method according to the present invention will be described.

2. 1. Interference Measurement Resource Information

Interference measurement resource refers to resource for measurement of interference as background information for reporting CSI by a UE in an environment in which the amount of UL and DL resources is dynamically changed. An eNB may transmit information about interference measurement resource to the UE via a higher layer signal (e.g., a radio resource control (RRC) layer or a media access control (MAC) layer signal) or a physical layer signal so as to notify the UE of resource in which the UE needs to measure interference to DL transmission in UL resource.

The interference measurement resource information may include location information for notifying the UE of a location of resource configured as interference measurement resource. Here, the location of the interference measurement resource may be determined according to at least one of offset information of a subframe, period information of a subframe, and subcarrier or OFDM/SC-FDMA symbol index information.

The location information of the interference measurement resource may include offset information of a subframe. That is, the eNB may determine only a specific DL subframe in which the UE will perform DL measurement among resources used for DL in resource configured as UL resource of resources configured as UL resources and notify the UE of the determined subframe through the subframe offset information. Here, the determined subframe may be one or more subframes. For example, when the eNB transmits the location information of the interference measurement resource to the UE, the offset information may indicate the determined subframe based on a subframe in which the location information of the interference measurement resource is transmitted. In addition, the offset information may be expressed as index information of the subframe.

The location information of the interference measurement resource may include period information of the subframe. That is, the eNB may determine only DL subframes with a specific period in which the UE will perform DL measurement among resources used for DL in resources configured as UL resources and notify the UE of the determined subframe through the subframe period information. Here, the subframe period information may indicate a period of a subframe for interference measurement in a unit of a integer multiple of one or more radio frames/half frames/subframes.

In addition, the location information of the interference measurement resource may include OFDM/SC-FDMA symbol and/or subcarrier index information. That is, the eNB may determine only a specific OFDM symbol and/or specific subcarrier of a random DL subframe in which the UE will perform DL measurement among resources used for DL in resources configured as UL resources. Here, the number of the determined OFDM symbol and/or subcarrier may be one or more.

The eNB may use the aforementioned information alone or combine and use one or more pieces of the information in order to notify the UE of the location of the interference measurement resource determined for interference measurement of the UE. For example, the UE is configured to perform interference measurement in all OFDM symbols of a subframe with a specific period, the eNB may transmit the location information of the interference measurement resource including subframe period and offset information only to the UE, and when the UE is configured to perform interference measurement using a specific resource element of a specific subframe, the eNB may transmit the location information of the interference measurement resource including subframe offset and/or symbol/subcarrier index information only to the UE.

The aforementioned interference measurement resource needs to have the form of a signal present in a legacy 3GPP LTE/LTE-A system. This is because existing signaling format can be used and a signal that a specific UE wants to avoid in interference measurement can be easily excluded. For example, when the interference measurement resource is actually used for UL, a location of resource for interference measurement having a specific signaling format form to corresponding UEs and nulling of a signal may be indicated at the corresponding location in order to exclude the signal of the specific UE. In addition, when the interference measurement resource is actually used for DL, the eNB may notify UEs that receive a DL signal that a specific UE wants to avoid in interference measurement of the UE of the location of resources for interference measurement having a specific signaling format form and indicate that a meaningful signal is not transmitted to the eNB at the corresponding location.

1) The interference measurement resource may have a form of a UL transmission signal, which can be more effectively used in that an interference measurement operation is performed in a region configured as UL resource on existing UEs.

As an example of the interference measurement resource, the eNB may configure a specific SRS or DMRS and indicate interference measurement to be performed at a resource location of the corresponding reference signal. That is, when the eNB wants specific UL resource to be used for DL transmission, the eNB may transmit configuration information of the specific SRS or DMRS to UEs that are targets of the operation and command to the UEs to measure interference at the resource location of the corresponding reference signal and to report CSI of resource to be used for DL transmission. That is, the aforementioned interference measurement resource information may include configuration information of reference signal. An example of the configuration information of the reference signal may include sequence information of an SRS or DMRS configured in the interference measurement resource, cyclic shift information of the sequence of the configured SRS or DMRS, spreading code information, frequency shift information, etc. In addition, the configuration information of the reference signal needs to be fixedly configured so as to be previously known to both the eNB and the UE.

The eNB notifies the UE of information indicating that zero power is additionally supplied to SRS or DMRS for interference measurement through the interference measurement resource information such that the corresponding UE can directly measure interference between cells except for cell interference in the corresponding resource. That is, the UE can measure interference of adjacent cells based on a region to which zero power is supplied. In particular, in the case of DMRS, since a plurality of DMRSs can be code division multiplexed (CDM) in the same frequency-time resource, the UE may perform despreading in interference measurement resource in which the DMRS is transmitted using a CDM sequence (or a spreading code) of a specific DMRS configured for interference measurement (or supply of zero power may be configured), perform nulling on a sequence that is actually used as the DMRS, and then operate to measure observed remaining interference. Here, the eNB may allocate a sequence that is not used as a DMRS configured for interference measurement in an adjacent cell such that the UE may operate to measure interference between cells except for cell interference in the corresponding resource.

2) The interference measurement resource may have a form of a DL transmission signal, which is advantageous in that corresponding resource has a signal format appropriate for actual use thereof so as to smoothen an operation of a UE with capability of understanding the use conversion. That is, when interference measurement resource is actually used for DL, the UE have the same signal format for channel states from the eNB, and thus, can measure a DL signal or interference of adjacent cells according to use (UL or DL) of the corresponding resource using a format of the same interference measurement resource.

As an example of the interference measurement resource, the eNB may configure a specific CRS or CSI-RS and indicate interference measurement to be performed at a resource location of the corresponding reference signal. That is, when the eNB wants specific UL resource to be used for DL transmission, the eNB may transmit configuration information of the specific CRS or CSI-RS to UEs that are targets of the operation and command to the UEs to measure interference at the resource location of the corresponding reference signal and to report CSI of resource to be used for DL transmission. As described above, the aforementioned interference measurement resource information may include configuration information of reference signal. The configuration information of the reference signal may include sequence information of a CRS or CSI-RS configured in the interference measurement resource, cyclic shift information of the sequence of the configured CRS or CSI-RS, spreading code information, frequency shift information, etc. In addition, the configuration information of the reference signal needs to be fixedly configured so as to be previously known to both the eNB and the UE.

Like in the UL transmission signal form, the eNB notifies the UE of information indicating that zero power is additionally supplied to CRS or CSI-RS for interference measurement through the interference measurement resource information such that the corresponding UE can directly measure interference between cells except for cell interference in the corresponding resource. That is, the UE can measure interference of adjacent cells based on a region to which zero power is supplied.

2. 2. Determination of Valid Interference Measurement Resource

As described in 2. 1. above, the interference measurement resource may be semi-statically configured using a higher layer signal such as an RRC signal. As described above, this is because the location information of the interference measurement resource includes many configuration parameters such as the subframe resource, offset, subcarrier, and/or symbol index of the corresponding resource, and thus, overhead is too high to use a physical layer signal.

As described above, the eNB uses a specific subframe for DL or UL according to a traffic situation and dynamically determines use of the corresponding subframe, a subframe including semi-statically configured interference measurement resource may also be dynamically determined. This causes issues in terms of interference measurement. For example, when the eNB commands the UE to perform interference measurement using a specific CSI-RS configuration, if the eNB uses a subframe in which corresponding interference measurement resource is present for UL and an adjacent UE in the same cell transmits a PUSCH, a strong signal is observed from the corresponding interference measurement resource. The PUSCH signal of the UE in the same cell corresponds to interference that does not actually occur when the corresponding subframe is used for DL, and thus needs to be excluded from interference measurement. Thus, when use of a subframe is dynamically changed, an operation for appropriately using interference measurement resource that is semi-statically configured is also required.

Likewise, when the use of the subframe is dynamically changed, the eNB may transmit indication information indicating whether interference measurement resource is valid to the UE in order to notify the UE of whether semi-statically configured interference measurement is valid. The indication information may be classified as following according to use of a subframe including the interference measurement resource.

Hereinafter, for convenience of description, it is assumed that UE(s) connected to the same cell as a corresponding UE except for a UE that intends to perform interference measurement know a location of interference measurement resource.

2. 2. 1. When a Subframe Including Interference Measurement Resource is Used for UL FIG. 7 is a schematic diagram illustrating a case in which a subframe including interference measurement resource is used for UL according to an embodiment of the present invention.

Figure 7:
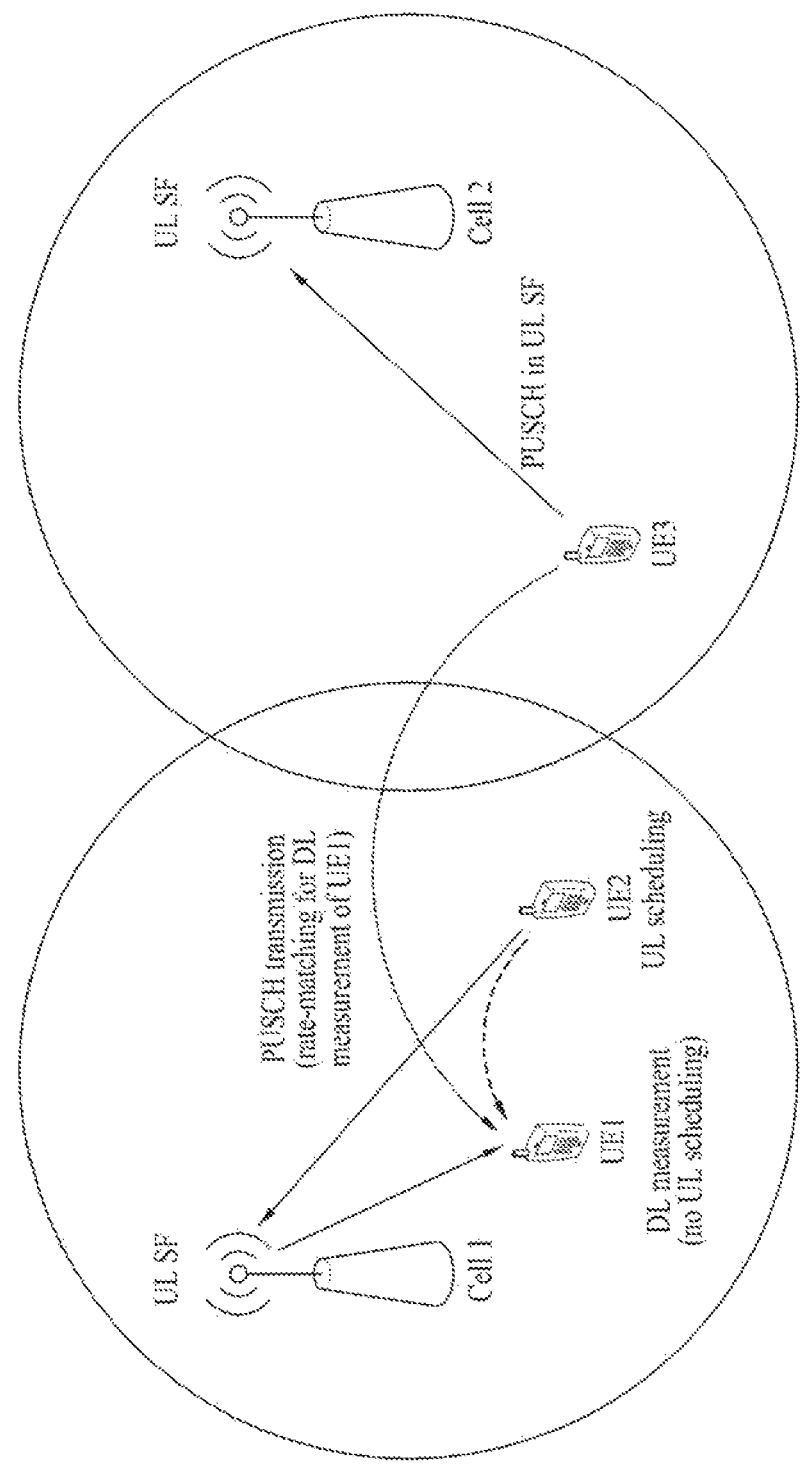
FIG. 7 is a schematic diagram illustrating a case in which a subframe including interference measurement resource is used for UL according to an embodiment of the present invention.

Referring to FIG. 7, when an eNB of a Cell 1 semi-statically configures interference measurement resource for measuring interference by a specific UE UE1 within coverage, since use of a subframe is dynamically changed, a subframe including interference measurement resource is used as a uplink subframe (UL SF) and the corresponding subframe is also used as a UL SF in an adjacent cell Cell 2.

Operations of UEs are now described. The UE 1 does not perform scheduling for UL transmission and measures DL interference in a subframe including interference measurement resource. In addition, the UE 2 belonging to the same cell as the UE 1 transmits UL data to an eNB of the Cell 1 through a PUSCH in a subframe including the interference measurement resource due to UL scheduling. A UE 3 that does not belong to the same cell coverage as the UE 1 also transmits UL data through a PUSCH to an eNB of the Cell 2 in a subframe including the interference measurement resource due to UL scheduling.

When a subframe including interference measurement resource, in which a specific UE performs interference measurement, is used for UL, other UEs (in particular, UEs connected to the same cell) may perform nulling on the corresponding interference measurement resource during UL transmission in the corresponding subframe. That is, in FIG. 7, when the UE 1 measures interference in specific resource, the UE 2 connected to the same cell may perform nulling on a location of interference measurement resource in a transmission location of a PUSCH of the UE 1 and apply rate matching to data to be transmitted through the PUSCH. In addition, during a CoMP operation, the UE 3 may also perform nulling a location of the interference measurement resource in the PUSCH transmission region and apply rate matching to data to be transmitted through the PUSCH. Likewise, other UEs UE 2 and/or UE 3 that do not measure interference may perform nulling UL data at the location of the interference measurement resource, and thus, the UE 1 can more accurately measure interference.

As described above, the interference measurement resource may have the same DL transmission pattern such as a CRS or a CSI-RS or the same UL pattern such as an SRS or a DMRS. In this case, other UEs UE 2 and/or UE 3 may perform nulling a transmission of a PUSCH according to a transmission pattern of a DL RS or a pattern of a UL RS and operate to perform rate matching on data to be transmitted through a PUSCH. In addition, as described above, when the interference measurement resource has the same pattern as a DMRS, the UE 1 may perform dispreading in an interference measurement resource region using a configured DMRS CDM sequence such that other UEs can perform nulling on the DMRS sequence that is actually used as a reference signal and then measure remaining interference.

Likewise, when a subframe including the interference measurement resource is used for UL, if a UE in the same cell does not perform nulling on the interference measurement resource, appropriate interference measurement is not performed. To address this issue, an eNB may transmit indication information indicating whether interference measurement resource positioned in a corresponding subframe is valid to a UE via a physical layer signal or a MAC layer signal. Here, the indication information may be configured in the form of an indicator indicting whether nulling is performed on the location of the interference measurement resource in the PUSCH transmission region by other UEs. In addition, the indication information may be transmitted every subframe including the interference measurement resource or may be configured in the form of a bitmap for one or more subframes and transmitted with a specific period. As described above, when a CSI measurement period includes a plurality of subframes, the indication information may include information about the number of valid subframes contained in the corresponding period.

The UE may consider that interference measurement resource is valid only upon receiving the indication information indicating that nulling is performed on the interference measurement resource region in a PUSCH transmission region of other UEs. That is, the UE may measure interference in the valid interference measurement resource only and omit interference measurement in invalid interference measurement resource.

2. 2. 2. When a Subframe Including Interference Measurement Resource is Used for DL FIG. 8 is a schematic diagram illustrating a case in which a subframe including interference measurement resource is used for DL according to an embodiment of the present invention.

Figure 8:
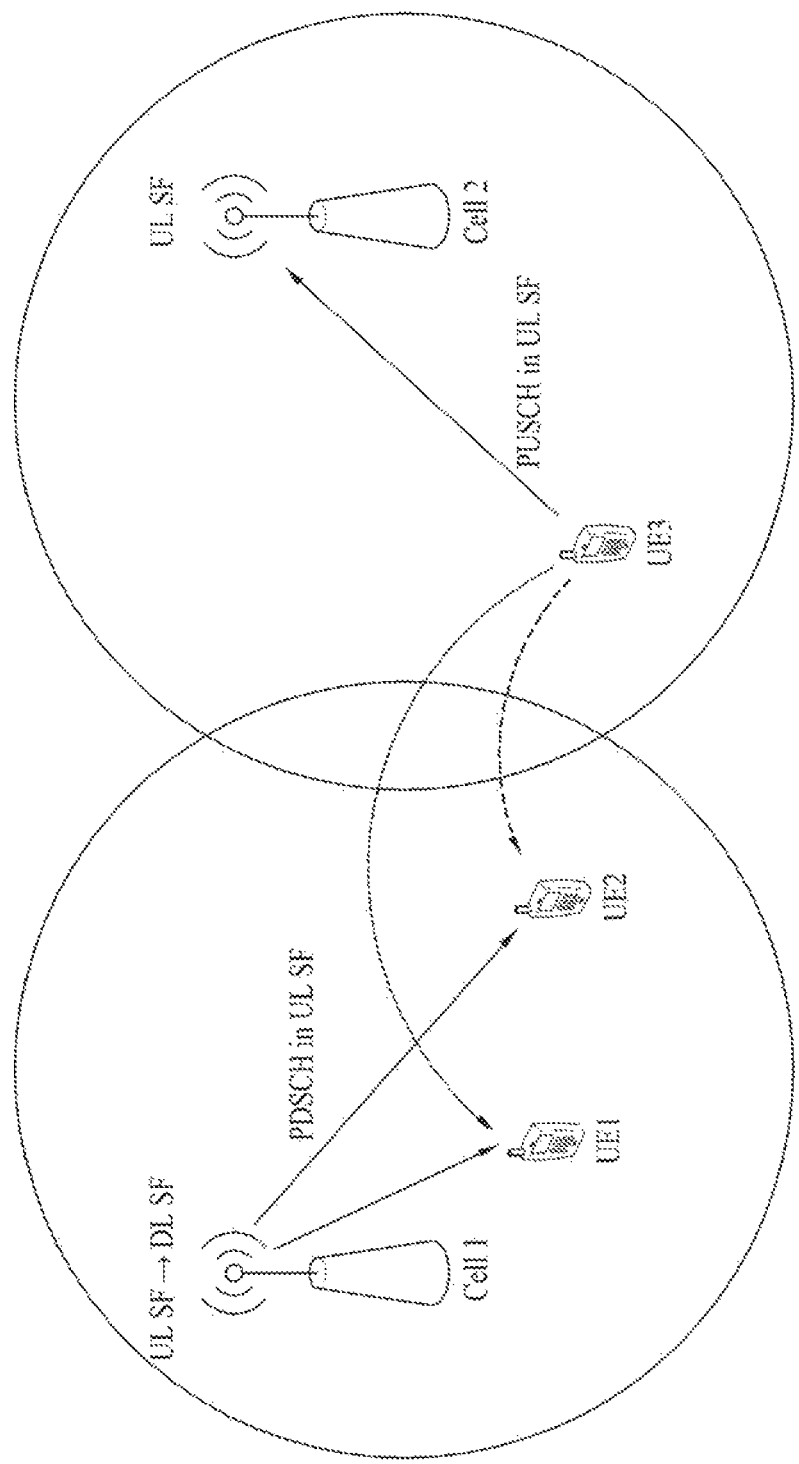
FIG. 8 is a schematic diagram illustrating a case in which a subframe including interference measurement resource is used for DL according to an embodiment of the present invention.

Referring to FIG. 8, when an eNB of a Cell 1 semi-statically configures interference measurement resource for measuring interference by a specific UE UE1 within coverage, since use of a subframe is dynamically changed, a subframe including interference measurement resource is used as a downlink subframe (DL SF) and the corresponding subframe is also used as a UL SF in an adjacent cell Cell 2.

Operations of UEs are now described. The UE 1 measures DL interference in a subframe including interference measurement resource. In addition, the UE 2 belonging to the same cell as the UE 1 receives DL data from an eNB (Cell 1) through a PDSCH in a subframe including the interference measurement resource due to DL scheduling. A UE 3 that does not belong to the same cell coverage as the UE 1 transmits UL data through a PUSCH to an eNB (Cell 2) in a subframe including the interference measurement resource due to UL scheduling.

Like in FIG. 8, the UE may consider the aforementioned interference measurement resource that is semi-statically configured as potential interference measurement resource and determine the interference measurement resource as valid interference measurement resource only when a corresponding UL subframe is actually used for DL transmission. For example, even if an eNB configures interference measurement resource to a specific UE via a higher layer signal, when the eNB schedules UL transmission to the corresponding UE in a corresponding subframe, the corresponding UE needs to perform the signal transmission operation and thus cannot perform interference measurement. Accordingly, in this case, interference measurement resource in which a higher layer signal is configured is considered to be invalid, and a measured value at a corresponding point in time needs to be excluded from CSI calculation.

Likewise, when a subframe including interference measurement resource in which a specific UE performs interference measurement is actually used for UL, the eNB may not appropriately perform interference measurement. To address this issue, an eNB may transmit indication information indicating whether interference measurement resource positioned in a corresponding subframe is valid to a UE via a physical layer signal or a MAC layer signal. Here, the indication information may be configured in the form of an indicator indicting whether the corresponding subframe is used for DL or UL. In addition, the indication information may be transmitted every subframe including the interference measurement resource or may be configured in the form of a bitmap for one or more subframes and transmitted with a specific period. As described above, when a CSI measurement period includes a plurality of subframes, the indication information may include information about the number of valid subframes contained in the corresponding period.

The UE may consider that interference measurement resource is valid only upon receiving the indication information indicating that a specific subframe including interference measurement resource is actually used for DL. That is, the UE may measure interference in the valid interference measurement resource only and omit interference measurement in invalid interference measurement resource.

In addition, an indicator for triggering aperiodic CSI reporting may be an indicator indicating validity of interference measurement resource. For example, CSI request information contained in a UL DCI format can be used. That is, when aperiodic CSI reporting is triggered in a specific subframe or a specific subframe is determined as valid reference resource about aperiodic CSI reporting triggered in another subframe, the UE may consider that the interference measurement resource included in the corresponding subframe is valid, measure interference, and use the interference for CSI calculation. That is, when aperiodic CSI reporting is not triggered in a specific subframe or a specific subframe is not determined as valid reference resource about aperiodic CSI reporting triggered in another subframe, the UE consider that the interference measurement resource included in the corresponding subframe is not valid. In order to prevent a measured value of the valid interference resource and a measured value of the invalid interference resource from being mixed or to correspond to errors of receiving the indication information about whether interference measurement resource is valid by the UE, the UE may omit a procedure of combining with interference measured in another subframe and operate to use only interference measured in the corresponding subframe during calculation of CSI based on interference measured in a subframe determined as a UL subframe.

2. 3. Interference Measurement Resource Configuration and Interference Adjustment As described above, when a UE measures adjacent cell interference, the adjacent cell dynamically changes use of a subframe including interference measurement resource, interference measured by the corresponding UE may not be uniformly maintained. For example, when an adjacent uses a subframe of subframes including interference measurement resource for PUSCH transmission of a UE of the corresponding cell but uses another subframe for PDSCH transmission of an eNB, since a transmission object (an eNB or a UE) is changed in each subframe, spatial characteristics (e.g., interference covariance matrix) of interference as well as an overall interference power level is also changed, and thus, it may be difficult to accurately measure interference.

To address the aforementioned issue, an eNB of each cell may transmit information about change in use of a subframe to an eNB of an adjacent cell. That is, an eNB of each cell may transmit a message including an index of a UL subframe to be used for DL transmission or UL transmission with very high possibility to an eNB of the adjacent cell. An eNB that receives the message from the eNB of the adjacent cell may intensively configure interference measurement resource in a subframe determined by the corresponding message to prevent excessive change in the interference measurement due to the aforementioned use of the subframe. Here, the eNB may compare a specific threshold with calculated possibility and notify an eNB of an adjacent cell of an index of a subframe having possibility that is equal to or more than the specific threshold.

In addition, there is a method of scheduling such that an eNB uniformly maintains a changing degree of interference that affects an adjacent cell in a specific subframe if possible. For example, when the eNB uses a specific UL subframe for DL transmission, the eNB may appropriately adjust transmission power of the eNB and may operate such that the attribute of interference to the adjacent cell is similar to a level of interference affected by UL transmission of the UE present in a cell of the eNB.

Meanwhile, the adjacent cell can measure how long consistency of interference in the cell is maintained. For example, the UE may measure changeability of an interference level of the same interference measurement resource and periodically or aperiodically (e.g., when change in the interference level exceeds a predetermined level) report the measured changeability to an eNB. Here, changeability information of the interference level may include a maximum interference level, a minimum interference level, a difference between the maximum and the minimum, an index of resource on which a predetermined level or more of interference is exerted, etc. Likewise, the eNB that receives the changeability information of the interference level from the UE may transmit a message for requesting an eNB of an adjacent cell to uniformly maintain the interference level to the eNB of the adjacent cell. The message for requesting of the uniform interference level may include a changing degree (the maximum, the minimum, the difference therebetween, etc.) of the interference level, information about whether a desired level or more interference is exerted, information about an index of resource on which a desired level or more interference is exerted, etc.

The eNB may fluidly operate according to the message for requesting a uniform interference level, received from the adjacent cell.

That is, when the eNB transmits an index of a subframe to be used for DL transmission or UL transmission of a UL subframe with very high possibility to an eNB of the adjacent cell, a threshold as a reference for calculation of the possibility may be dynamically changed according to reception of the message for requesting a uniform interference level from the adjacent cell. For example, upon receiving the message for requesting the uniform interference level from an eNB of an adjacent cell or receiving a corresponding message a predetermined number of times or more for a predetermined period of time, the eNB may determine that change in interference exerted on the adjacent cell is high and change the threshold to a high threshold, and when the eNB does not receive a message for requesting an interference level for a predetermined period of time, the eNB may determine that change in interference exerted on the adjacent cell is low and change that threshold to a high threshold.

In addition, when a UL subframe is used for DL transmission, adjustment of transmission power may be dynamically changed according to reception of the message for requesting the uniform interference level from the adjacent cell. For example, upon receiving the message for requesting the uniform interference level from an eNB of an adjacent cell or receiving a corresponding message a predetermined number of times or more for a predetermined period of time, the eNB may determine that change in interference exerted on the adjacent cell is high and change the threshold to a low threshold, and when the eNB does not receive a message for requesting an interference level for a predetermined period of time, the eNB may determine that change in interference exerted on the adjacent cell is low and increase transmission power.

4. Overview of Apparatus to which the Present Invention is Applicable

Figure 9:
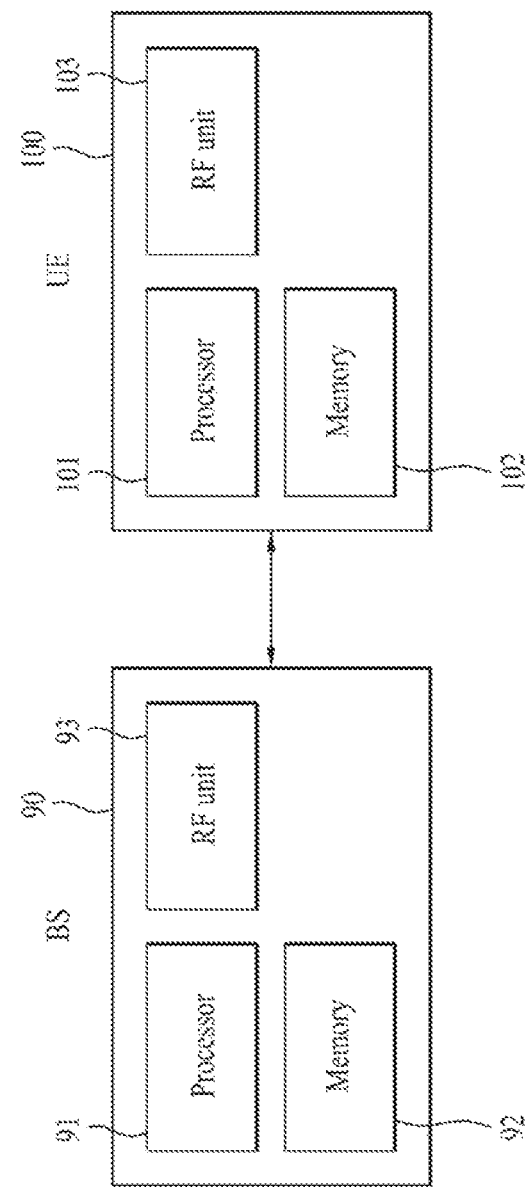
FIG. 9 is a block diagram of a wireless communication apparatus according to an embodiment of the present invention.

FIG. 9 is a block diagram of a wireless communication apparatus according to an embodiment of the present invention.

Referring to FIG. 9, a wireless communication system includes a BS 90 and a plurality of UEs 100 positioned within a region of the BS 90.

The BS 90 includes a processor 91, a memory 92, and a radio frequency (RF) unit 93. The processor 91 embodies the proposed functions, processes, and/or methods. Layers of a wireless interface protocol may be embodied by the processor 91. The memory 92 is connected to the processor 91 and stores various pieces of information for driving the processor 91. The RF unit 93 is connected to the processor 91 and transmits and/or receives a radio signal.

The UE 100 includes a processor 101, a memory 102, and an RF unit 103. The processor 101 embodies the proposed functions, processes, and/or methods. Layers of a wireless interface protocol may be embodied by the processor 101. The memory 102 is connected to the processor 101 and stores various pieces of information for driving the processor 101. The RF unit 103 is connected to the processor 101 and transmits and/or receives a radio signal.

The memories 92 and 102 may be disposed within or outside the processors 91 and 101 and may be connected to the processors 91 and 101 via various means. In addition, the BS 90 and/or the UE 100 may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The data transmission/reception method in a wireless access system according to the present invention has been described in terms of an example applied to a $3^{rd}$ generation partnership project long term evolution (3GPP LTE) system but can be applied to various wireless access systems in addition to the 3GPP LTE system.

The invention claimed is:

1. A method for obtaining channel state information in a wireless access system for supporting traffic adaption, the method performed by a user equipment (UE) and comprising:
    receiving interference measurement resource information comprising location information of interference measurement resource;
    receiving uplink (UL) and downlink (DL) configuration information indicating whether one or more UL subframes among UL resources are reconfigured to one or more DL subframes for the traffic adaption; and
    measuring interference on the interference measurement resource included in the one or more DL subframes being reconfigured based on the UL and DL configuration information,
    wherein the location information of the interference measurement resource include a subframe offset, a subframe period, and
    wherein a location of the interference measurement resource is specified using a combination the subframe offset and the subframe period.

2. The method of claim 1, wherein the interference measurement resource has a form of zero-power channel state information reference signal (CSI-RS) resource configuration.

3. The method of claim 1, wherein the interference measurement resource is configured via higher layer signaling.

4. The method of claim 1, wherein the first UL and DL configuration is indicated by Physical Downlink Control Channel (PDCCH).

5. The method of claim 1, the method further comprising:
    calculating the channel state information using the measured interference; and
    transmitting the calculated channel state information to an eNB (evolved Node B).

6. The method of claim 1,
    wherein the UL and DL configuration information indicating whether one or more UL subframes are reconfigured is dynamic control information, and
    wherein the UL resources is configured by system information.

7. A user equipment (UE) for measuring channel state information in a wireless access system for supporting an environment in which amounts of uplink (UL) and downlink (DL) resources are dynamically changed, the UE comprising:

a radio frequency (RF) unit for transmitting the channel state information and for transmitting and receiving a radio signal; and a processor which is configured to:
- receive interference measurement resource information comprising location information of interference measurement resource,
- receive uplink (UL) and downlink (DL) configuration information indicating whether one or more UL subframes among UL resources are reconfigured to one or more DL subframes for the traffic adaption, and
- measure interference on the interference measurement resource included in the one or more DL subframes being reconfigured based on the UL and DL configuration information, wherein the location information of the interference measurement resource include a subframe offset, a subframe period, and wherein a location of the interference measurement resource is specified using a combination the subframe offset and the subframe period.

8. The UE of claim 7, wherein the interference measurement resource has a form of zero-power channel state information reference signal (CSI-RS) resource configuration.

9. The UE of claim 7, wherein the interference measurement resource is configured via higher layer signaling.

10. The UE of claim 7, wherein the first UL and DL configuration is indicated by Physical Downlink Control Channel (PDCCH).

11. The UE of claim 7, the processor further configured to calculate the channel state information using the measured interference and transmit the calculated channel state information to an eNB (evolved Node B).

12. The UE of claim 7,
- wherein the UL and DL configuration information indicating whether one or more UL subframes are reconfigured is dynamic control information, and
- wherein the UL resources is configured by system information.

* * * * *